(12) United States Patent
Petrovic et al.

(10) Patent No.: US 9,758,734 B2
(45) Date of Patent: Sep. 12, 2017

(54) HYDROISOMERIZATION CATALYSTS BASED ON FE CONTAINING MOLECULAR SIEVES

(71) Applicant: BASF Corporation, Florham Park, NJ (US)

(72) Inventors: Ivan Petrovic, Princeton, NJ (US); Ahmad Moini, Princeton, NJ (US); Scott Hedrick, Solon, OH (US); Martin Kraus, Westfield, NJ (US)

(73) Assignee: BASF Corporation, Florham Park, NJ (US)

( * ) Notice: Subject to any disclaimer, the term of this patent is extended or adjusted under 35 U.S.C. 154(b) by 167 days.

(21) Appl. No.: 14/202,127

(22) Filed: Mar. 10, 2014

(65) Prior Publication Data

US 2014/0275689 A1   Sep. 18, 2014

Related U.S. Application Data

(60) Provisional application No. 61/778,989, filed on Mar. 13, 2013.

(51) Int. Cl.

| | |
|---|---|
| *C10G 45/64* | (2006.01) |
| *B01J 29/072* | (2006.01) |
| *C10G 3/00* | (2006.01) |
| *B01J 29/14* | (2006.01) |
| *B01J 29/24* | (2006.01) |
| *B01J 29/68* | (2006.01) |

(Continued)

(52) U.S. Cl.
CPC ............ *C10G 45/64* (2013.01); *B01J 29/072* (2013.01); *B01J 29/14* (2013.01); *B01J 29/24* (2013.01); *B01J 29/68* (2013.01); *B01J 29/7492* (2013.01); *B01J 29/76* (2013.01); *B01J 29/7653* (2013.01); *B01J 29/7661* (2013.01); *B01J 29/7684* (2013.01); *B01J 29/7692* (2013.01); *C10G 3/00* (2013.01); *C10G 3/50* (2013.01); *B01J 2229/183* (2013.01); *C10G 2300/1011* (2013.01); *C10G 2300/1037* (2013.01); *C10G 2300/304* (2013.01); *C10G 2400/04* (2013.01); *C10G 2400/08* (2013.01); *Y02P 30/20* (2015.11)

(58) Field of Classification Search
CPC ............................. B01J 29/88; C07C 5/2775
See application file for complete search history.

(56) References Cited

U.S. PATENT DOCUMENTS

| | | |
|---|---|---|
| 4,076,842 A | 2/1978 | Plank et al. |
| 4,374,296 A | 2/1983 | Haag et al. |

(Continued)

FOREIGN PATENT DOCUMENTS

| | | | | |
|---|---|---|---|---|
| GB | 1555928 A | * | 11/1979 | ............. B01D 53/02 |
| KR | 10-2011-0044237 A | | 4/2011 | |

OTHER PUBLICATIONS

International Search Report dated Jul. 10, 2014.

(Continued)

*Primary Examiner* — Alyssa L Cepluch
(74) *Attorney, Agent, or Firm* — Lowenstein Sandler LLP

(57) ABSTRACT

The hydroisomerization of a paraffinic hydrocarbon feedstock obtained from renewable sources is effectively achieved by passing the feedstock in the presence of hydrogen over a hydroisomerization catalyst comprising a crystalline metal silicate molecular sieve, in which a portion of the crystalline framework contains iron.

15 Claims, 1 Drawing Sheet

(51) Int. Cl.
    *B01J 29/74*    (2006.01)
    *B01J 29/76*    (2006.01)

(56) References Cited

U.S. PATENT DOCUMENTS

| | | | |
|---|---|---|---|
| 5,019,661 A | 5/1991 | Mole | |
| 5,077,026 A | 12/1991 | Nair et al. | |
| 5,185,136 A * | 2/1993 | Vaughan | B01J 29/046 208/137 |
| 5,271,761 A * | 12/1993 | Skeels | C01B 39/065 95/116 |
| 5,332,566 A | 7/1994 | Moini | |
| 5,405,596 A | 4/1995 | Moini et al. | |
| 6,773,694 B1 | 8/2004 | Lesch et al. | |
| 7,166,756 B2 | 1/2007 | Acharya et al. | |
| 7,816,570 B2 * | 10/2010 | Roberts, IV | C10G 45/58 585/14 |
| 8,026,401 B2 | 9/2011 | Abhari et al. | |
| 8,143,469 B2 | 3/2012 | Koivusalmi et al. | |
| 8,193,400 B2 | 6/2012 | Brady et al. | |
| 8,212,094 B2 | 7/2012 | Myllyoja et al. | |
| 8,629,073 B2 | 1/2014 | Guillon et al. | |
| 2006/0073962 A1 | 4/2006 | Murphy et al. | |
| 2006/0128555 A1 | 6/2006 | Shan et al. | |
| 2008/0244962 A1 * | 10/2008 | Abhari | C10L 1/04 44/308 |
| 2008/0293988 A1 | 11/2008 | Mitchell et al. | |
| 2011/0190562 A1 * | 8/2011 | Guillon | B01J 29/72 585/477 |
| 2011/0319696 A1 | 12/2011 | Chen et al. | |
| 2012/0065449 A1 | 3/2012 | Loewenstein et al. | |

OTHER PUBLICATIONS

J. Houzvicka et al., ZSM-5—An active, selective and stable catalyst for skeletal isomerisation of n-butene, Applied Catalysis A: General 165, (1997), pp. 443-449. Elsevier Science B.V.

Paul Meriaudeau, et al., Characterization of isomorphously substituted ZSM-23 and catalytic properties in n-butene isomerization, J. Chem. Soc., Faraday Trans., 1998, 94(3), pp. 467-471.

M.A. Asensi, et al., Isomorphous substitution in ZSM-22 zeolite. The role of zeolite acidity and crystal size during teh skeletal isomerization of n-butene, Applied Catalysis A: General 174 (1998), pp. 163-175. Elsevier Science B.V.

P. Canizares, et al., Delaumination of ferrierite by ammonium hexafluorosilicate treatment: characterization and testing in the skeletal isomerization of n-butene, Applied Catalysis A: General 248 (2003), pp. 227-237. Elsevier Science B.V.

European Search Report for EP Application No. EP 14 77 8971 dated Nov. 18, 2016, 4 pages.

* cited by examiner

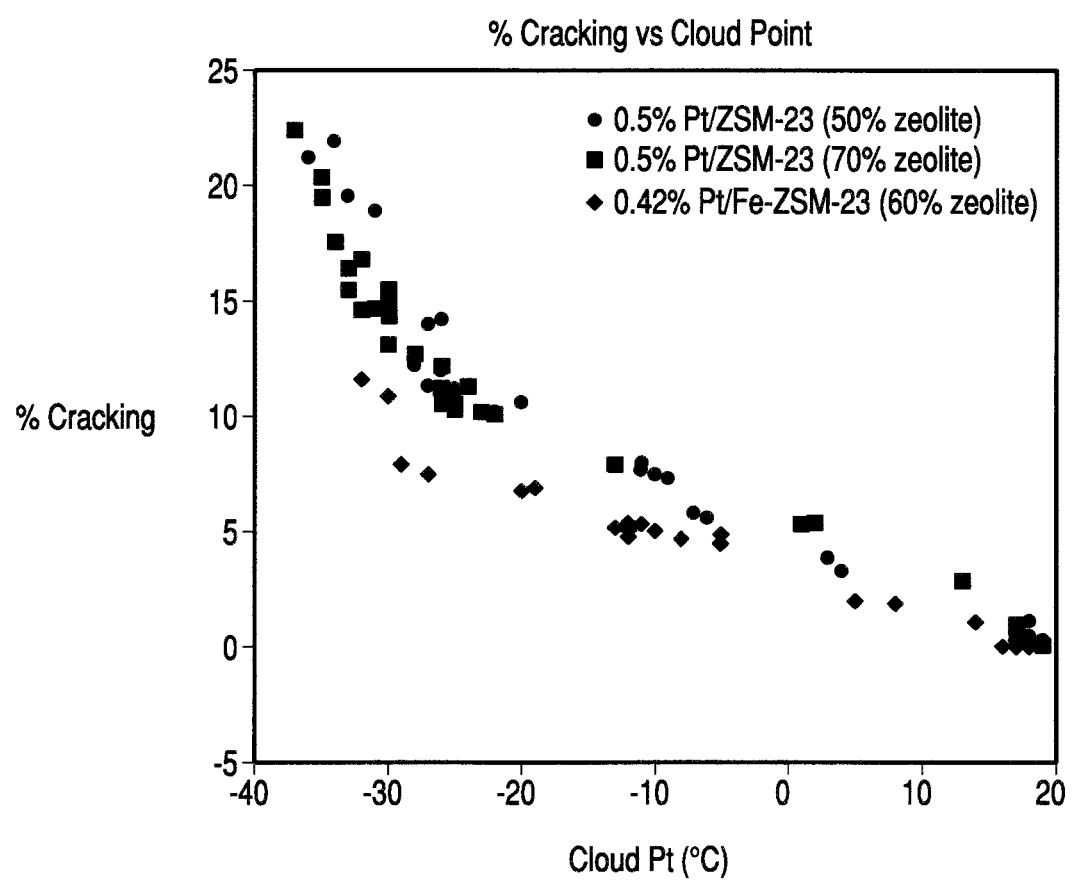

HYDROISOMERIZATION CATALYSTS BASED ON FE CONTAINING MOLECULAR SIEVES

FIELD OF THE INVENTION

This invention relates to a process for producing fuels or fuel blending components from renewable feedstocks. The invention, in particular, relates to a process for the manufacture of branched saturated hydrocarbons from renewable sources, and particularly to a process for the manufacture of hydrocarbons suitable for diesel or jet fuel. This invention relates to a process for effecting isomerization of paraffins, including normal paraffins from deoxygenated renewable sources, in the presence of hydrogen and a modified zeolite crystalline material.

BACKGROUND OF THE INVENTION

It has heretofore been known that the isomerization of paraffins, such as n-hexane, to equilibrium mixtures of branched chain isomers, substantially increases the octane rating of the paraffin hydrocarbons. Prior art processes dealing with paraffin isomerization include a liquid-phase process utilizing a catalyst containing an aluminum chloride dissolved in antimony trichloride, which, together with HCl formed during the reaction, are corrosive. Another process, referred to as the Penex process, which has been used for isomerizing pentane and hexane fractions from refinery naphthas and natural gasolines in the presence of hydrogen and a platinum containing catalyst requires the continuous addition to the feed of an organic chloride which also produces HCl. Another process involves reaction of a pentane/hexane feed in the presence of hydrogen and a catalyst containing platinum highly dispersed on hydrogen mordenite at a pressure of 150-350 psi and a temperature of 400 to 550° F., with a maximum water level in the feed of 50 ppm. The above processes have been costly to operate because of extensive corrosive effects attributable to the use of highly acidic catalysts or by-products arising from use of such catalyst, thereby requiring expensive alloy equipment. Moreover, moisture and high molecular weight hydrocarbons usually present as contaminants in the charge stock cause deterioration of the catalyst and necessitate frequent replacement thereof. Another process which has been carried out at a higher temperature of 700 to 800° F. utilizes a catalyst such as platinum on a silica-alumina base in the presence of hydrogen. At the high temperatures required, the equilibrium mixture of isomers is such that substantial recycling of a portion of the paraffin feed is necessary to obtain the desired improvement in octane rating.

U.S. Pat. No. 4,374,296 discloses a process for upgrading normal paraffinic hydrocarbons or cycloparaffins by hydroisomerization in the presence of a specified highly siliceous porous zeolite crystalline material of enhanced acid activity having a minor proportion of a Group VIII metal combined therewith. In addition, the invention described therein involves continuous hydroisomerization of normal paraffins or cycloparaffins for extended periods of time in the presence of hydrogen and the above indicated catalyst so as to produce a mixture of branched chain isomers having a high octane rating without the use of corrosion resistant alloy equipment or frequent replacement of catalyst material. In addition, the invention is directed to the hydroisomerization of light paraffinic hydrocarbons such as n-pentane, n-hexane or mixtures thereof in the presence of hydrogen and a specified catalyst comprising a porous crystalline zeolite of enhanced acid activity and defined silica/alumina mole ratio and constraint index and having a minor proportion of platinum, supported on an alumina carrier under specified reaction conditions.

As the demand for diesel fuel increases worldwide there is increasing interest in sources other than petroleum crude oil for producing diesel fuel. One such non-petroleum source is what has been termed renewable sources. These renewable sources include, but are not limited to, plant oils such as corn, palm oil, rapeseed, canola, soybean and algal oils, animal fats such as inedible tallow, fish oils and various waste streams such as yellow and brown greases and sewage sludge. The common feature of these sources is that they are composed of triglycerides and Free Fatty Acids (FFA). Both of these compounds contain n-paraffin chains having from about 8 to about 24 carbon atoms. The n-paraffin chains in the tri-glycerides or FFAs can also be mono-, di- or poly-unsaturated. Some of the glycerides from the renewable sources may be monoglycerides or diglycerides instead of or in addition to the trigylcerides.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, U.S. 2004/0230085 A1 discloses a process for treating a hydrocarbon component of biological origin by hydrodeoxygenation followed by isomerization. Undesired oxygen is typically removed from fatty acids or their esters by deoxygenation reactions. The deoxygenation of bio oils and fats, which are oils and fats based on biological material, to produce hydrocarbons suitable as diesel fuel products, may be carried out by catalytic hydroprocessing, such as hydrocracking, but also more controlled hydrotreating conditions may be utilized.

Presently, hydroisomerization catalysis typically involves a bi-functional catalyst with an acid function, and a precious metal (PM) function. Acidity is usually provided by a molecular sieve component (zeolite, silico-alumino-phosphates, etc.), and the PM function is very often provided by platinum deposited on the catalyst. Molecular sieves used in currently available catalysts are provided with specific content of aluminum or silica to control the acidity. These catalysts show very good activity, but also suffer from relatively high cracking, such that a catalyst passivation step using molecules such as tert-butyl amine (TBA) is used to control the acidity and thus improve the process yield.

SUMMARY OF THE INVENTION

In accordance with the present invention, it has been found that marked improvements are realized in a process for isomerizing paraffinic hydrocarbons admixed with hydrogen in the presence of a catalyst comprising a crystalline metal silicate molecular sieve, which includes iron in the crystalline framework. The iron (Fe) zeolite silicate material employed will generally have a medium pore size of from 3-10 Angstroms in diameter.

Other aspects provide methods for making a biofuel, the methods comprising: providing a source of paraffins derived from a bio-based feed; contacting the deoxygenated bio-based feed with a hydroisomerization catalyst of the present invention; and yielding a biofuel.

BRIEF DESCRIPTION OF THE DRAWING

The drawing is a plot comparing % cracking relative to the cloud point of the product using Pt/ZSM-23 and Pt/Fe-ZSM-23 catalysts.

DETAILED DESCRIPTION OF THE INVENTION

The present invention relates to an improved process for the manufacture of hydrocarbons from renewable sources, such as plant oils/fats and animal oils/fats, comprising a hydrotreating/deoxygenating step and an isomerisation step. In particular, the invention relates to the transformation of bio-based feeds into n-paraffins and converting the obtained n-paraffins into diesel and jet fuel range branched alkanes using isomerisation, with high fuel yield. In general, the invention is particularly concerned with the afore-mentioned isomerization step to convert the n-paraffins into branched alkanes, which takes place in the presence of hydrogen and a modified zeolite catalyst. Hydrotreating and/or deoxygenating a raw feedstock from renewable sources is well known in the art and not part of the present invention.

As stated, the present invention relates to a process for producing a hydrocarbon stream useful as diesel or jet fuels from non-petroleum feedstocks such as renewable feedstocks originating from plants or animals. The term renewable feedstock is meant to include feedstocks other than those obtained from petroleum crude oil. Another term that has been used to describe this class of feedstock is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, camelina oil, cranbe oil, tallow, yellow and brown greases, lard, train oil, fats in milk, fish oil, algal oil, cranbe oil, sewage sludge, and the like. The glycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and petroleum-derived hydrocarbons may also be used as the feedstock. Other feedstock components which may be used, especially as a co-feed component in combination with the above listed feedstocks include spent motor oils and industrial lubricants, used paraffin waxes, liquids derived from the gasification of coal, biomass, natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a petroleum based or other process into a valuable co-feed component to the current process. It is to be understood that the process of this invention directed to hydroisomerization of n-alkanes with the iron-modified zeolite of this invention is also applicable to petroleum-based feeds.

The renewable raw feedstock is flowed to a first hydrotreating reaction zone comprising one or more catalyst beds in one or more reactors to remove contaminants as well as provide deoxygenation. Hydrogenation and hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-aluminas or activated carbon.

The catalysts enumerated above are also capable of catalyzing decarboxylation, decarbonylation and/or hydrodeoxygenation of the raw feedstock to remove oxygen. Decarboxylation, decarbonylation, and hydrodeoxygenation are herein collectively referred to as deoxygenation reactions.

The present invention utilizes catalysts comprising an Fe-containing molecular sieve in the hydroisomerization of a $nC_{8+}$ hydrocarbon feedstream, such as obtained from a raw renewable source as above described. The $nC_{8+}$ hydrocarbon feedstream is contacted with a specific catalyst as described below under hydroisomerization conditions that include temperatures from about 200 to about 500° C., and pressures from about 400 to about 2000 psig.

In general, the feedstreams suitable for use in the present process are $nC_{8+}$ hydrocarbon feedstreams boiling in the range of about 230 to about 570° C., preferably about 370 to about 540° C., and more preferably about 400 to about 500° C. The product that is formed is a diesel or jet fuel having a cloud point of from 0° C. to −65° C. In general, the diesel product will have a cloud point of from −10° C. to −50° C., while the jet fuel will have a cloud point of from −25° C. to −65° C.

The modified iron-containing catalysts used in the present process comprise crystalline metal silicate molecular sieves having a framework composition involving the following molar relationship:

$$[X_aX^1_{1-a}]_2O_3:(y)YO_2$$

wherein X is iron, $X^1$ is aluminum, a is at least 0.5; Y is silicon; and y is from about 20 to about 300, usually from about 35 to about 200. Preferably, a is at least 0.6, more preferably at least 0.75, and most preferably more than 0.90. In the as-synthesized form, the crystalline material has a formula, on an anhydrous basis and in terms of moles of oxides per y moles of $YO_2$, as follows:

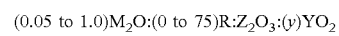

$$(0.05 \text{ to } 1.0)M_2O:(0 \text{ to } 75)R:Z_2O_3:(y)YO_2$$

wherein M is an alkali metal cation, R is a specific organic directing agent and Z is a mixture of X and $X^1$ as described above. Also y is as described above. The M and R components are associated with the material as a result of their presence during crystallization, and are easily removed by post-crystallization methods hereinafter more particularly described.

The metal silicate molecular sieves useful in this invention are preferably zeolites that contain iron in the crystalline framework. Methods of making same are patented and known to those of ordinary skill in the art. Examples of useful molecular sieves include zeolites such as ZSM-5, ZSM-12, ZSM-22, ZSM-23, ZSM-35, ZSM-48, ZSM-57, zeolite beta, MCM-22 and faujasite. Metal silicates such as mordenite and ferrierite are also useful.

Zeolite ZSM-23 and other zeolites can be suitably prepared from a solution containing sources of an alkaline metal oxide, preferably sodium oxide, sources of nitrogen-containing cation, preferably pyrrolidine, an oxide of aluminum, and oxide of silicon and water having the appropriate composition, in terms of mole ratios of oxides, as is known and described in the aforementioned patents. In accordance with this invention, at least a portion of the aluminum oxides are replaced with oxides of iron, so that the iron is incorporated into the tetrahedrally coordinated framework position of the zeolite.

The composition for the synthesis of synthetic zeolites can be prepared utilizing materials which can supply the appropriate oxide. Such compositions include aluminates, alumina, ferrierites, ferric or ferrous oxides, silicates, silica hydrosol, silica gel, silicic acid and hydroxides. It will be understood that each oxide component utilized in the reaction mixture for preparing the zeolites can be supplied by one or more essential reactants and they can be mixed together in any order. For example, any oxide can be supplied by an aqueous solution, sodium hydroxide or by an aqueous solution of a suitable silicate; the cation derived from pyrrolidine can be either supplied by pyrrolidine or a salt thereof. Other organic nitrogen-containing templates can be used as known in the art for providing the desired zeolite. The reaction mixture can be prepared either batchwise or continuously. Crystal size and crystallization time of the zeolites composition will vary with the nature of the reaction mixture employed.

The present invention, thus, is directed to the use of isomorphously substituted (Fe for Al) molecular sieves, i.e. iron (Fe) in the tetrahedrally coordinated framework position instead of the typical aluminum (Al), in hydroisomerization catalysts. Substitution of iron into the framework allows for the modification of molecular sieve acid properties and, as a result, provides a catalyst with superior properties when compared to the currently available catalysts. Performance advantages of the catalysts of this invention include increased yield (lower cracking) and more favorable product distribution (more di-branched products). In addition, the catalysts of this invention do not require a passivation treatment to control acidity, which simplifies the hydroisomerization process. Examples of commercial use include, for example, emerging field of advanced biodiesel and biojet fuel production from a variety of feedstocks such as processed vegetable oils, animal fats and biomass, as described previously.

The catalysts of this invention comprise a catalytic material and a matrix component. The catalytic material is made up of a molecular sieve that preferably has a pre-loaded platinum group metal. The catalytic material and the matrix component are processed together to form the hydroisomerization catalyst. Reference to "pre-loaded" means that the molecular sieve is impregnated or otherwise associated with the platinum group metal in the absence of a matrix component and before calcination of the zeolite and/or formation of a catalyst body. It has been found that pre-loading of a platinum group metal, such as platinum, before mixing with the matrix component and forming the catalyst body results in a highly effective hydroisomerization catalyst, resulting in excellent yields for diesel fuel. Should it be desired, a platinum group metal can also be placed on the matrix.

The catalyst can comprise an overall platinum group metal amount that is the total of the amount of the pre-loaded platinum group metal and the amount of the matrix-based platinum group metal. In one or more embodiments, the platinum group metal is concentrated on the molecular sieve. That is, the majority of platinum group metal present in the hydroisomerization catalyst in its entirety has been associated with the molecular sieve. In one embodiment, 100% by weight of the platinum group metal is associated with the molecular sieve. In one or more embodiments, 51 to 99% by weight of the overall platinum group metal is located on the molecular sieve and 1 to 49% by weight of the overall platinum group metal is located on the matrix. Other embodiments provide that 99%, 95%, 90%, 85%, 80%, 75%, 70%, 65%, 60%, 55%, or even 51% by weight of the platinum group metal is associated with the molecular sieve.

In another embodiment, the catalyst further comprises a promoter that can enhance catalyst activity, such as a base metal. Exemplary base metals include nickel, copper, iron, and tin. The base metal can be present in an amount in the range of 0.1 to 20.0% (or 0.1 to 10%, or 0.1 to 3%) by weight of the catalyst (molecular sieve).

In one or more embodiments, the pre-loaded platinum group metal comprises platinum, palladium, rhodium, ruthenium, or combinations thereof. A detailed embodiment provides that the pre-loaded platinum group metal comprises platinum that is present in an amount in the range of 0.01 to 10, preferably 0.5 to 2.0%, and more preferably 0.1 to about 1.0% by weight of the catalyst (molecular sieve).

The matrix, or binder, component is one that binds with the pre-loaded molecular sieve to form the catalytic material. The matrix component can comprise a silica, an alumina, or combinations thereof. In a detailed embodiment, the matrix component is based on a material selected from the group consisting of: a silica sol, a hydroxylated alumina, a calcined alumina, an aluminophosphate, a silica, and combinations thereof. The hydroxylated alumina can be selected from the group consisting of boehmite, pseudo boehmite or gelatinous boehmite, diaspore, nordstrandite, bayerite, gibbsite, alumina having hydroxyl groups added to the surface and mixtures thereof. The calcined alumina can be selected from the group consisting of gamma, delta, theta, kappa, and rho alumina.

In one or more embodiments, the pre-loaded molecular sieve is present in an amount in the range of 20-90% by weight of the hydroisomerization catalyst and the matrix component is present in an amount in the range of 80-10% by weight of the hydroisomerization catalyst.

In another aspect, a hydroisomerization catalyst comprises a molecular sieve and a matrix component for processing a bio-based feed into a biofuel made by the process of: synthesizing a molecular sieve; purifying the molecular sieve; associating the molecular sieve with a platinum group metal in the absence of the matrix component to form the pre-loaded molecular sieve before formation of a catalyst body; mixing the pre-loaded molecular sieve with the matrix component to form a mixture; processing the mixture to form a catalyst body; and drying and calcining the catalyst body to form the hydroisomerization catalyst.

The step of associating the molecular sieve with a platinum group metal can be achieved by methods known in the art. For example, a platinum group metal can be associated with the molecular sieve by impregnation. Reference to "impregnation" means that a material is soaked with a precious metal-containing solution. In some embodiments, impregnation of platinum group metals is achieved by incipient wetness. In other embodiments, impregnation is achieved by ion exchange, where a platinum group metal ion exchanges with a cation of the molecular sieve. In yet other embodiments, the molecular sieve is processed by both incipient wetness and ion exchange. Colloidal platinum solutions can also be impregnated into the molecular sieve.

By impregnating the molecular sieve with the platinum group metal in the absence of the matrix component and before formation of the catalyst body, the metal can be concentrated on the molecular sieve rather than over a mixture of the molecular sieve and the matrix component. In some embodiments, however, it may be desirable to provide the matrix component with a platinum group metal associated with it too. This association with the matrix component can be done as desired during the manufacturing process. For example, the matrix component can be impregnated ahead of time, such as before it is mixed with the pre-loaded molecular sieve. Another alternative is to associate the platinum group metal with the catalyst body in its entirety (both the pre-loaded molecular sieve and the matrix component) after the catalyst body has been calcined.

After the pre-loaded molecular sieve and the matrix component are mixed, the mixture is processed to form a catalyst body. A preferred way to process the mixture is to extrude it through a shaping orifice to form an extruded catalyst body, or extrudate. Other catalyst bodies can be shaped into spheres or any other convenient formation.

The extrudate can be dried at a temperature in the range of 50-250° C. The extrudate can be calcined at a temperature in the range of 350-700° C., preferably in the range of 400-550° C.

Example 1

This example sets forth the formation of Fe-ZSM-23.
The following chemicals were used to form the Fe-ZSM-23.
1. NaOH as pellets
2. Ludox AS-40 (silica)
3. Iron (III) Nitrate Nonahydrate—Fe(NO$_3$)$_3$*9 H$_2$O
4. Pyrrolidine 99%
5. Sulfuric Acid 96%
6. De-ionized water—DIW The resulting gel had a composition with 6.5% solids content and the ratio of the materials used in the gel preparation can be expressed as:

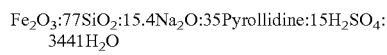
Fe$_2$O$_3$:77SiO$_2$:15.4Na$_2$O:35Pyrollidine:15H$_2$SO$_4$: 3441H$_2$O Procedure Solution 1: In a 600 cc clean, teflon liner 7.9 g of NaOH pellets were added. Next 306.4 g of deionized (DI) water were introduced to the NaOH pellets and mixed until the NaOH pellets were completely dissolved. To this solution, 73.7 g of Ludox AS-40 were added over a period of 5 minutes with mixing. The solution became milky, white in color.

Solution 2: At the same time, solution 2 was prepared by dissolving 5.2 g of Iron (III) Nitrate Nonahydrate in 43.6 g of DI water with stirring. The solution turned bright, light orange in color. Once the iron (III) nitrate nonahydrate was completely dissolved, 15.8 g of Pyrrolidine 99% were weighed out and added to the Iron (III) nitrate/DIW solution with stirring.

Next, solution 2 was added to solution 1 containing NaOH/Ludox AS-40/DIW over a period of 15 minutes. The milky white gel solution above turned a light brownish-rust color and thickened up but remained fluid. The pH was ~13.8.

A pH adjustment was done by slowly adding 7.8 g of 96% H$_2$SO$_4$ drop-wise using a plastic pipet.

Upon completion of this step, the gel was allowed to mix for an additional 30 minutes. The gel thinned out, and the pH was measured. The pH of the gel was ~13.0. The gel was charged to the autoclave. It was closed up properly and pressure checked for leaks with nitrogen gas. The nitrogen gas was released after it was verified that there were no leaks.

The crystallization of the above mixture was done as follows:
The temperature was ramped up to 170° C. in 8 hours, and held at 170° C. for 50 hours. The stirring rate was 500 rpm. Once the synthesis was completed, the mixture was cooled down to room temperature and the autoclave opened to remove its contents.

The product was recovered by filtration using a Buchner funnel and flask set-up. The filter-cake was then placed into a drying oven and dried overnight at 85° C.

Example 2

The ZSM-23 zeolite samples prepared in accordance with the procedures of Example 1 were tested as follows: Table 2 shows results of ammonia TPD (temperature programmed desorption) of two Fe-ZSM-23 samples, one having a Si/Fe~40, and the other a Si/Fe~35, and a Al-ZSM-23 control. Ammonia TPD provides information about the number of acid sites (volume of desorbed ammonia), and about the relative strength of the sites (higher desorption temperature~stronger acid sites). Results presented in Table 1 show that, the Peak I desorption temperature for Fe-ZSM-23 is about the same as for Al-ZSM-23, but for Peak II the desorption temperature for Fe-ZSM-23 is reduced by about 60-80° C. compared to Al-ZSM-23. This implies relatively weaker acid sites in Fe-ZSM-23.

TABLE 1

| | | Ammonia temperature desorption | | | | |
| | | Peak I | | Peak II | | |
| Zeolite | Si/Al(Fe) | Temp. (° C.) | NH$_3$ desorbed (ml/g) | Temp. (° C.) | NH$_3$ desorbed (ml/g) | Total NH$_3$ desorbed amount (ml/g) |
|---|---|---|---|---|---|---|
| Al-ZSM-23 | 42 | 190 | 2.0 | 368 | 6.0 | 8.0 |
| Fe-ZSM-23 | 40 | 187 | 2.2 | 331 | 6.3 | 8.5 |
| Fe-ZSM-23 | 35 | 181 | 2.6 | 307 | 7.6 | 10.2 |

Example 3

A sample of the Fe-ZSM-23 zeolite with Si/Fe ratio of ~40 was prepared following the procedure of Example 1. After drying, the zeolite powder was de-agglomerated using mortar and pestle, and was associated with a platinum metal-containing solution using the incipient wetness method to achieve 0.7 wt. % Pt loading on the molecular sieve. This composition was then dried at 110° C. In order to prepare a formed catalyst for testing, 60 parts by wt. (water and organic free) of the Pt loaded Fe-ZSM-23 molecular sieve was combined with 40 parts by wt. (water free) of alumina binder and thoroughly mixed using mortar and pestle with addition of water and nitric acid, until a good consistency for extrusion was achieved. The resulting mixture was then extruded using a lab hand operated extrusion press through a 1/16 inch opening. Extrudates were dried at 110° C., broken into about 1/4 inch pieces and calcined in flowing air at 540° C. Overall platinum loading of the final catalyst was 0.42 wt. %.

Under typical testing conditions, 30 cc of catalyst extrudates (1/16") were loaded into a stainless steel fixed-bed reactor approximately 61.75 inches in length. The catalyst bed itself was approximately 12.75 inches in length while inert Denstone™ alumina granules were used as both bed support and preheat medium. The reactor was heated by a 3-zone Thermcraft™ electric furnace and was equipped with a thermowell that houses five thermocouples for monitoring of the axial temperature profile through the bed. The liquid feedstock consisted primarily of $C_{15}$-$C_{18}$ n-alkanes.

During the experiments, liquid samples of reactor effluent were collected through a pressurized sample bomb at designated times/reaction temperatures and analyzed for cloud point (CP) as well as product distribution. The cloud point, or temperature at which a liquid mixture first begins to solidify, was determined using a PAC MPP5GS cloud point analyzer. The cloud point can be related to the quantity of isomerized and cracked species in the effluent and thus catalyst activity, i.e. the lower the cloud point, the higher the degree of isomerization and/or cracking and the higher the catalyst activity. The product distribution was determined by gas chromatography (GC) using an Agilent 7890 GC equipped with a flame-ionization detector (FID) and HP-5 capillary column (30 m×0.32 mm×0.25 µm). Product distribution was typically categorized as follows: (1) percent cracking (all hydrocarbons≤$C_{10}$), (2) percent isomerization (all iso-alkanes≥$C_{11}$), and (3) diesel yield (all hydrocarbons≥$C_{11}$).

Prior to commencing each run, the catalyst was reduced overnight in flowing hydrogen at 370° C. Next, the reactor was cooled to ~235° C. and subsequently passivated with tert-butyl amine (TBA). The purpose of this passivation is to dampen the initial cracking activity by temporarily blocking acid sites that would otherwise be used in the reaction. This procedure involved flowing TBA-spiked feed (110 ppm, N-basis) over the catalyst at 235° C. and 580 psig at an LHSV of 3.5 hr$^{-1}$ for two hours and then at an LHSV of 1 hr$^{-1}$ for an additional 24 hours. Hydrogen was also used during passivation with a target flow rate such that the $H_2$ to feed volume ratio (std. cc/min $H_2$:cc/min feed) was 313. This is equivalent to 469.5 sccm and 156.5 sccm $H_2$ flow during the initial two hours and final 24 hours, respectively. TBA pretreatment was utilized in all experiments, unless otherwise noted.

At the conclusion of the passivation procedure, the reactor was idled under pressure (580 psig) while the TBA-spiked feed was switched to fresh feed without TBA. The reactor was then heated to 260° C. where the TBA-free feed along with hydrogen was re-introduced to the reactor at 1 hr$^{-1}$ LHSV and 156.5 sccm, respectively. Finally, the reaction temperature was slowly raised over the next 2-3 weeks from 260° C. to 320° C. (or higher in some cases). As the temperature was increased, the TBA desorbed, freeing acid sites which in turn resulted in an increase in activity. Often, this increase in activity could be observed for several days under isothermal conditions. Thus, the length of time held at a particular temperature varied and was dependent upon the change in activity. Once the rate of change in activity had diminished to approximately zero, the temperature was increased and held at that new value until the rate of change in activity had again diminished accordingly. At low activities (CP>0° C.), the temperature was typically raised in increments of 5-10° C. At higher activities, the temperature was typically raised in increments of 3-5° C. The experiment was stopped when cloud points reached values in the range −35° C.>CP>−40° C.

In the FIGURE, selectivity (i.e. % cracking) is improved for the Fe-ZSM-23 catalyst down to the cloud point of −30° C., even though reaction temperature using the iron-containing catalyst was 30° C. hotter than the temperature run using ZSM-23 aluminosilicate. Another advantage was that the passivation step with TBA was not needed in the run for the Fe-ZSM-23.

Table 2 compares the di-branching peak areas for $C_{11+}$ product during runs using the ZSM-23 aluminosilicate and the iron-containing ZSM-23.

TABLE 2

| | DI-BRANCHING PEAK AREAS Product Cloud Point = −20° C. | |
|---|---|---|
| Carbon # | 0.5% Pt/ZSM-23 50% zeolite | 0.42% Pt/Fe-ZSM-23 60% zeolite |
| C11 | 5.00 | 4.97 |
| C12 | 6.84 | 7.53 |
| C13 | 7.05 | 8.50 |
| C14 | 7.66 | 9.94 |
| C15 | 54.14 | 78.40 |
| C16 | 156.62 | 213.00 |
| C17 | 99.57 | 131.94 |
| C18 | 241.53 | 288.86 |
| TOTAL | 578.41 | 743.14 |

The invention claimed is:

1. A process for hydroisomerization of a paraffinic hydrocarbon feedstream, the process comprising:
   contacting said hydrocarbon feedstream with hydrogen and a catalyst comprising a crystalline metal silicate molecular sieve having a crystalline framework, wherein the crystalline framework comprises aluminum located at aluminum sites, wherein at least a portion of the aluminum sites are isomorphously-substituted with iron, and yielding a product having an increase in branched hydrocarbons relative to said hydrocarbon feedstream,
   wherein the metal silicate molecular sieve is ZSM-12, ZSM-22, ZSM-23, ZSM-48, ZSM-57, or MCM-22,
   wherein the catalyst further contains from 0.01 to 10 wt. % of a platinum group metal and
   wherein said metal silicate molecular sieve has a molar framework formula $[X_aX^1_{1-a}]_2O_3:(y)YO_2$ wherein X is iron, $X^1$ is aluminum, a is at least 0.90; Y is silicon; and y is from about 20 to about 300.

2. The process of claim 1, wherein said molecular sieve has a pore size of about 3 to 10 angstroms.

3. The process of claim 1, wherein said platinum group metal is platinum.

4. The process of claim 1, wherein said paraffinic hydrocarbon feedstream comprises $nC_{8+}$ hydrocarbons.

5. The process of claim 4, wherein said paraffinic hydrocarbon feedstream is obtained from the deoxygenation of a non-petroleum feedstock originating from one of plants or animals.

6. The process of claim 5, wherein said non-petroleum feedstock comprises glycerides and free fatty acids.

7. The process of claim 6, wherein said non-petroleum feedstock comprises palm oil.

8. The process of claim 1, wherein said molecular sieve in as synthesized form has a formula on an anhydrous basis of $$(0.05 \text{ to } 1.0)M_2O:(0 \text{ to } 75)R:Z_2O_3:(y)YO_2$$

wherein M is an alkali metal cation, R is a specific organic directing agent and Z is a mixture of X and X'.

9. The process of claim 1, wherein said product has a cloud point ranging from 0 to −65° C.

10. The process of claim 9, wherein said product is a diesel fuel having a cloud point ranging from −10 to −50° C.

11. The process of claim 9, wherein said product is a biojet fuel having a cloud point ranging from −25 to −65° C.

12. The process of claim 1, wherein said catalyst is not treated with a passivator.

13. The process of claim 1, wherein said catalyst further contains a base metal promoter.

14. The process of claim 13, wherein said base metal promoter is nickel.

15. The process of claim 1, wherein a majority of said platinum group metal is contained on said molecular sieve and said catalyst is mixed with a matrix material.

* * * * *